UNITED STATES PATENT OFFICE.

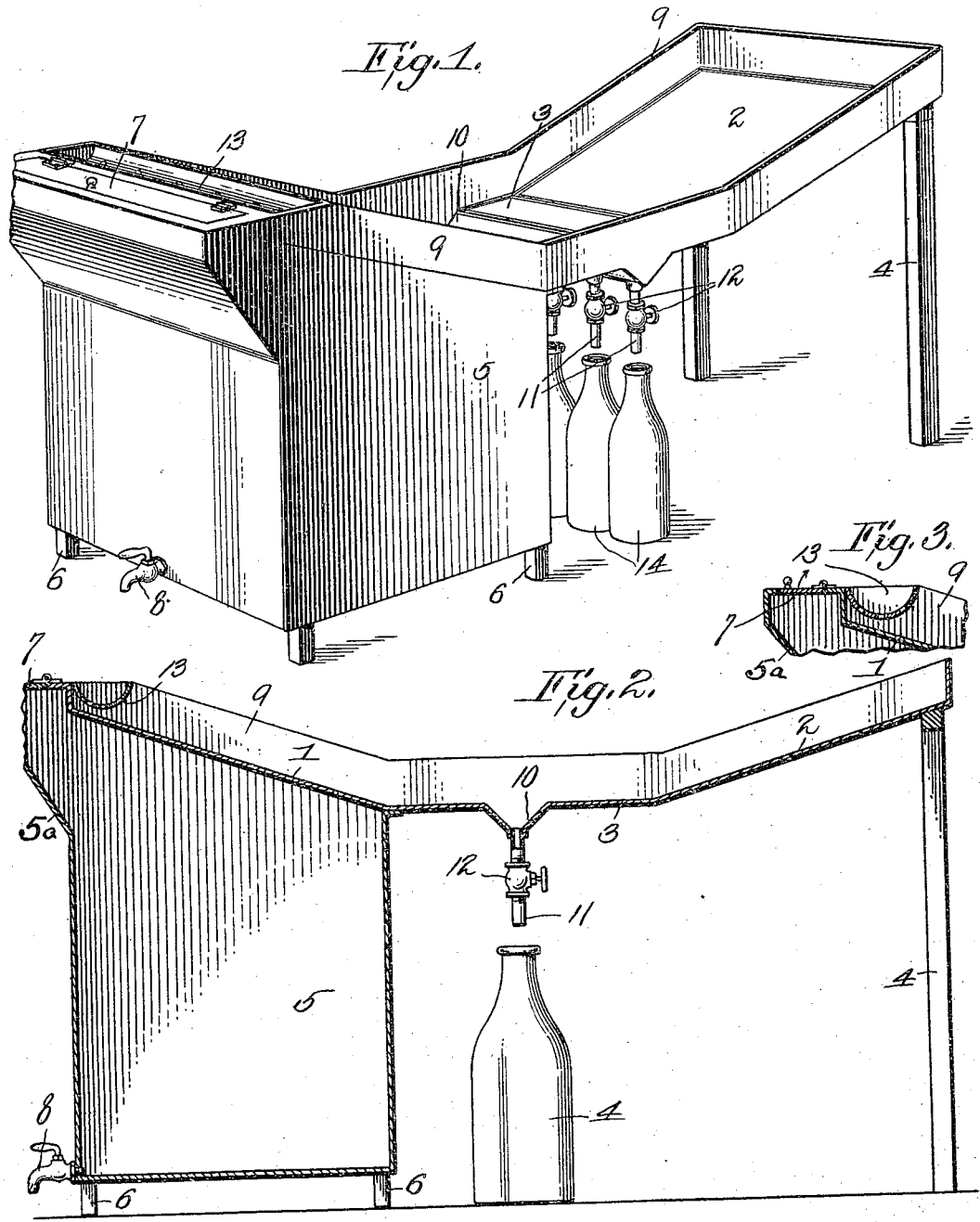
A. R. SCUTT.
BOTTLE FILLING DEVICE.
APPLICATION FILED JULY 10, 1909.
950,161. Patented Feb. 22, 1910.

ALTON R. SCUTT, OF CORBETT, VIRGINIA.

BOTTLE-FILLING DEVICE.

950,161.  Specification of Letters Patent. Patented Feb. 22, 1910.

Application filed July 10, 1909. Serial No. 506,907.

*To all whom it may concern:*

Be it known that I, ALTON R. SCUTT, a citizen of the United States, residing at Corbett, in the county of Fairfax and State of Virginia, have invented certain new and useful Improvements in Bottle-Filling Devices, of which the following is a specification.

The present invention relates to a novel device for simultaneously filling a number of bottles or like receptacles, with some liquid such as milk, and the object of the invention is the provision of a simple and inexpensive device of this character which can be readily kept in a clean and sanitary condition, and which will enable a large number of bottles to be filled in a comparatively short period of time.

The invention further contemplates a bottle filler embodying a novel construction whereby the milk is thoroughly cooled before entering the bottles, thereby enabling the milk to be kept pure and sweet without difficulty.

With these and other objects in view the invention consists in certain novel combinations and arrangements of the parts as will more fully appear as the description proceeds, the novel features thereof being pointed out in the appended claims.

For a full understanding of the invention, reference is to be had to the accompanying drawing, in which—

Figure 1 is a perspective view of the milk bottler and aerator which will be described for the purpose of illustrating the invention, Fig. 2 is a longitudinal vertical section through the same, and Fig. 3 is a detail view of the flared portion at the back of the tank.

Corresponding and like parts are referred to in the following description and indicated in all the views of the drawing by the same reference characters.

Specifically describing the embodiment of the invention shown in the drawing, the numerals 1 and 2 designate a pair of oppositely disposed inclined walls which have a substantially horizontal plate 3 interposed between the lower portions of the same. The inclined wall 2 is supported in an elevated position by means of the legs 4, while the inclined wall 1 forms the top of a cold water chamber or tank 5 supported upon the legs 6, a door 7 being provided in the top of the tank toward the rear thereof for placing ice water in the same, and a faucet 8 being provided at the bottom of the tank or chamber for drawing off the water. A vertical flange 9 surrounds the outer edges of the two inclined walls 1 and 2 and the intermediate horizontal plate 3, and the said plate 3 is formed at substantially its central portion with a V-shaped trough or depression 10 within which the milk is designed to collect. Leading downwardly from the bottom of the trough 10 is a series of bottle filling nozzles 11 which are each provided with a suitable valve 12. A perforated trough 13 for straining and aerating the milk is attached to the flange 9 at the upper end of the inclined wall 1, and the milk is designed to be turned into this trough from the receptacles within which it has been collected. The milk passes through the perforations in the trough 13, being thereby strained and aerated, and runs down the inclined wall 1 and over the plate 3 until it reaches the V-shaped trough 10, from which it passes through the various nozzles 11 into the respective bottles 14 which are arranged in a row under the nozzles as indicated in Fig. 1. As the said bottles 14 become filled, the valves 12 may be closed if such should be necessary to prevent the overflowing of any of the bottles. At this point it is desired to direct attention to the fact that the milk flows down the inclined wall 1 in a very thin film, and that this film of milk becomes thoroughly cooled from the ice water in the tank 5, thereby enabling the milk to be kept pure and sweet without difficulty.

In the preferred construction, the back of the tank 5 has the upper portion thereof flared rearwardly as indicated at 5ª, the door 7 being located immediately over this flared portion. This construction has the advantage of enabling the water within the tank to come into contact with and cool the entire length of the inclined wall 1, so that the milk will be thoroughly cooled as it flows down upon the said inclined wall. It may also be mentioned that the inclined bottom of the flared portion 5ª will serve to deflect into the tank 5 any ice or water which is dropped or poured through the opening normally closed by the door 7. Should it be desired to bottle any liquid without first cooling the same, the inclined wall 2 could be used for that purpose.

Having thus described the invention, what

I claim as new and desire to secure by Letters Patent is:

1. In a bottle filling device, the combination of a tank having the upper portion of one of the sides thereof flared outwardly, an inclined wall extending across the top of the tank, a door arranged over the before mentioned flared portion of the tank and disposed above the inclined wall, a trough at the lower end of the inclined wall, and a series of bottle filling nozzles leading from the trough.

2. In a bottle filling device, the combination of a pair of oppositely disposed inclined walls, a substantially horizontal plate interposed between the lower ends of the inclined walls and formed with a trough, a series of bottle filling nozzles leading from the trough, a flange surrounding the outer edges of the inclined walls and the horizontal plate, and means for cooling one of the inclined walls.

In testimony whereof I affix my signature in presence of two witnesses.

ALTON R. SCUTT.

Witnesses:
L. B. SCUTT,
E. C. GILBERT.